US005132712A

United States Patent [19]

Fletcher et al.

[11] Patent Number: 5,132,712

[45] Date of Patent: Jul. 21, 1992

[54] AUTOMATIC DUPLEX PRINTING APPARATUS

[75] Inventors: Gerald M. Fletcher, Pittsford; Gail J. Levy, Fairport, both of N.Y.

[73] Assignee: Xerox Corporation, Stamford, Conn.

[21] Appl. No.: 632,562

[22] Filed: Dec. 24, 1990

[51] Int. Cl.[5] .............................. G01D 15/06

[52] U.S. Cl. .............................. 346/159; 355/319

[58] Field of Search .............. 355/308, 309, 318, 319, 355/320; 346/157, 159, 160.1

[56] References Cited

U.S. PATENT DOCUMENTS 3,775,102 11/1973 Punnet .............................. 355/320 X
4,194,829 3/1980 Cavagnaro .............................. 355/319
4,536,078 8/1985 Ziehm .............................. 355/319 X
4,591,884 5/1986 Miyamoto et al. .............................. 355/319 X

*Primary Examiner*—A. T. Grimley
*Assistant Examiner*—Christopher Horgan

[57] ABSTRACT

As duplex printer apparatus utilizing non-contact printing devices in the form of a Direct Electrostatic Printer (DEP). Simplex images are formed on one side of an intermediate in the form of a belt using one or more DEP printing devices. A substrate such as plain paper is superimposed on the images formed on the intermediate. Continued movement of the belt in its endless path effects passage of the substrate past different DEP printing devices for forming images on the other side of the substrate.

26 Claims, 2 Drawing Sheets

AUTOMATIC DUPLEX PRINTING APPARATUS

BACKGROUND OF THE INVENTION

This invention relates to electrostatic printing devices and more particularly to duplex printing utilizing non-impact printing devices which utilize electronically addressable printheads for depositing developer in image configuration on plain paper substrates.

Many methods for automatiac duplex printing in xerographic processors are known. There is the two pass method employed in the Xerox 4000 TM and 9400 TM reproduction machines. That is, after the first side of copy sheets are imaged and fused, the sheets are collected in a duplex tray. Afther the last sheet in a set has been received in the duplex tray, the sheets are again passed through the xerographic processing stations. This time an image is transferred and fused onto the opposite side of each copy sheet having an image on the first side.

In the Xerox 9700 TM machine, the copy sheets also pass through the processing stations twice. However, they are not collected in a duplex tray. After the first image has been transferred and fused, the sheets pass through a stop and reverse mechanism (inverter). Then the sheets join in an interleafing fashion the stream of copy sheets to receive an image on the opposite side.

There are some disadvantages with these systems, in particular for a given image throughput rate. For example, two passes through the fuser require more energy, and the fuser needs to operate at twice the speed. During the first pass through the fuser, the paper loses 50 percent of its moisture. This curls the paper and makes the second pass for duplexing difficult. Paper picks up oil on the first pass through the fuser, sometimes leading to image deletions on the second image and oil deposits on the photoreceptor. Jam rates during two-pass duplex operation are much greater than for simplex operation. In the first place, in a two-pass duplex system, the paper path is usually very long, and the paper has to negotiate all obstacles twice. Excessive paper curl is not only troublesome in the processor but also extremely difficult to handle in output stackers and finishing devices.

In other prior art systems such as in U.S. Pat. No. 4,095,979, means are shown for "immediate" or single-pass duplex copying or forming first and second images sequentially on a photoreceptor. The first image is transferred from the photoreceptor to the first side of a copy sheet. Then the sheet is stripped off the photoreceptor, inverted while the first image remains unfixed, and then the second image is transferred to the second side of the copy sheet. Both images are then fixed onto the copy sheet by a suitable fuser. This type of system can be described as a "single-pass" to the fuser.

Other single-pass duplex printing methods use intermediate image carriers (belt or drum). The first and second images are sequentially formed on a photoreceptor. The first image is transferred to an intermediate image carrier. The copy sheet is then passed between the photoreceptor and the intermediate image carrier, simultaneously receiving first and second images.

The duplex methods discussed above only utilize one photoreceptor. Other systems, e.g. U.S. Pat. No. 3,580,070 and 3,775,102 deal with "single-pass duplex" methods employing two photoreceptors and two exposure systems. First images are deposited on one photoreceptor and second images are deposited on the other photoreceptor. These systems are considered th ultimate duplex throughput systems since they produce twice the number of images of "two-pass duplex" systems at same process speed. These "single-pass duplex" systems, however, generally require web paper feed in which the copy is spooled up on a roll or cut into individual sheets after fusing. This unfortunately, introduces additional components and complexity into the system.

U.S. Pat. No. 4,427,285 discloses a discrete copy sheet feed system rather than a web paper feed system. A two photoreceptor, "single-pass duplex" apparatus is disclosed wherein two images are formed, one on each photoreceptor and then transferred to opposite sides of the image receiving sheet.

U.S. Pat. No. 4,714,939 discloses an electrographic reproduction apparatus, of the single-pass type, capable of producing simplex or duplex copies on a receiver sheet traveling in a continuous direction along a path. The reproduction apparatus comprises a first dielectric member movable along a first path, a portion of such first path being tangent to and on one side of the sheet travel path. Transferable images, corresponding to information to be reproduced, are sequentially formed on such first member. A second member is movable along a second path. One portion of such second path is tangent to the sheet travel path on the opposite side from the first path and another portion of the second path, spaced from such one portion, is located to position the second member in image transfer relation to the first dielectric member. An electrostatic field, reversible in its effective direction, is utilized to transfer a transferable image from the first dielectric member to the second member at the portion of the second path where the first and second members are in image transfer relation and transfer such image from the second member to one side of a receiver sheet traveling along its travel path at the location where the position of the first path is tangent to the sheet travel path and for producing a duplex copy, a second image is transferred from the first dielectric member to the opposite side of such receiver sheet at the location where the portion of the first path is tangent to the sheet travel path.

U.S. Pat. No. 32,422 discloses a method and apparatus for producing duplex copies. First and second unfixed images are transferred to opposite sides of a copy sheet before fixing of either image to the copy sheet. The first and second unfixed images may be electroscopic images sequentially formed on a photoconductor by electrophotographic techniques. The first unfixed electroscopic image is transferred from the photoconductor to a first side of a copy sheet, the sheet is inverted while the first image thereon remains unfixed, the second unfixed electroscopic image is transferred to the second side of the copy sheet, the copy sheet with the first and second unfixed images thereon is then transported to a fixing station.

Another technique involving the use of only one photoconductor, utilizes an intermediate image transfer member to receive the first image formed on the photoconductor before transfer to a final support medium. The intermediate transfer member as disclosed in U.S. Pat. No. 3,671,118 and 3,697,170 is such a belt.

Of the various electrostatic printing techniques, the most familiar and widely utilized is that of xerography wherein latent electrostatic images formed on a charge retentive surface are developed by a suitable toner material to render the images visible, the images being subsequently transferred to plain paper.

A lesser known form of electrostatic printing is one that has come to be known as Direct Electrostatic Printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al. In general, this type of printing device uses electrostatic fields associated with addressable electrodes for allowing passage of developer material through selected apertures in a printhead structure. Additionally, electrostatic fields are used for attracting developer material to an imaging substrate in image configuration.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layers which a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fuji et al discloses a method and apparatus utilizing a controller having a plurality of openings or slit-like openings to control the passage of charged particles and to record a visible image of charged particles directly on an image receiving member. Specifically, disclosed therein is an improved device for supplying the charged particles to a control electrode that has allegedly made high-speed and stable recording possible. The improvement in Fuji et al lies in that the charged particles are supported on a supporting member and an alternating electric field is applied between the supporting member and the control electrode. Fuji et al purports to obviate at least some of the problems noted above with respect to Pressman et al. Thus, Fuji et al alleges that their device makes it possible to sufficiently supply the charged particles to the control electrode without scattering them.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a plurality of addressable recording electrodes and corresponding signal sources connected thereto for attracting the developer on the developing roller to the ordinary sheet by generating an electric field between the ordinary sheet and the developing roller according to the image information. A plurality of mutually insulated electrodes are provided on the developing roller and extend therefrom in one direction. A.C. and D.C. voltage sources are connected to the electrodes, for generating alternating electric fringte fields between adjacent ones of the electrodes to cause oscillations of the developer positioned between the adjacent electrodes along electric lines of force therebetween to thereby liberate the developeer from the developing roller.

U.S. Pat. No. 4,912,489 discloses a Direct Electrostatic Printing device comprising a printhead structure comprising a shield electrode structure and a control electrode structure supported by an insulative support member. The printhead structure is positioned such that the control electrode is opposite the toner supply. Wrong sign toner accumulates on the control electrode.

Single-pass duplex printing systems can offer significant reduction in paper handling complexity and greatly increase duplex output productivity. With low cost, high reliability marking approaches such as DEP printers, the addition of a second marking stage to allow single-pass duplex printing is justified because the extra machine complexity normally added for high throughput duplex (duplex path hardware, timing gates, timing sensors, etc.) would be eliminated.

BRIEF DESCRIPTION OF THE INVENTION

Briefly, the present invention utilizes the direct marking aspects of DEP in a unique combination. DEP toner imaging to an intermediate belt with subsequent transfer to a paper sheet provides one image side while toner imaging directly to the paper sheet provides the other image side of the duplex print. The intermediate belt acts both a DEP image receiver and as an electrostatic paper transport through the direct-to-paper DEP imaging system. The sytem for providing electrostatic tacking of the paper to the belt also provides the electrostatic fields for transfer of the intermediate image.

Thus, a first image is formed on an intermediate such as a belt moved in an endless path. The belt is first moved through a first imaging station containing one or more direct printing devices, for example, DEP (Direct Electrostatic Printer) printers. Simplex images are formed on the intermediate belt at the first imaging station. A cust sheet of plain paper is then superimposed over the simplex image and electrostatically adhered to the belt. Continued movement of the intermediate belt and the sheet of plain paper in synchronism causes the other side of the sheet of paper to pass through a second imaging station containing one or more direct imaging devices. Images are formed on the other side of the cut sheet.

DETAILED DESCRIPTION OF THE DRAWINGS

Figure 1:
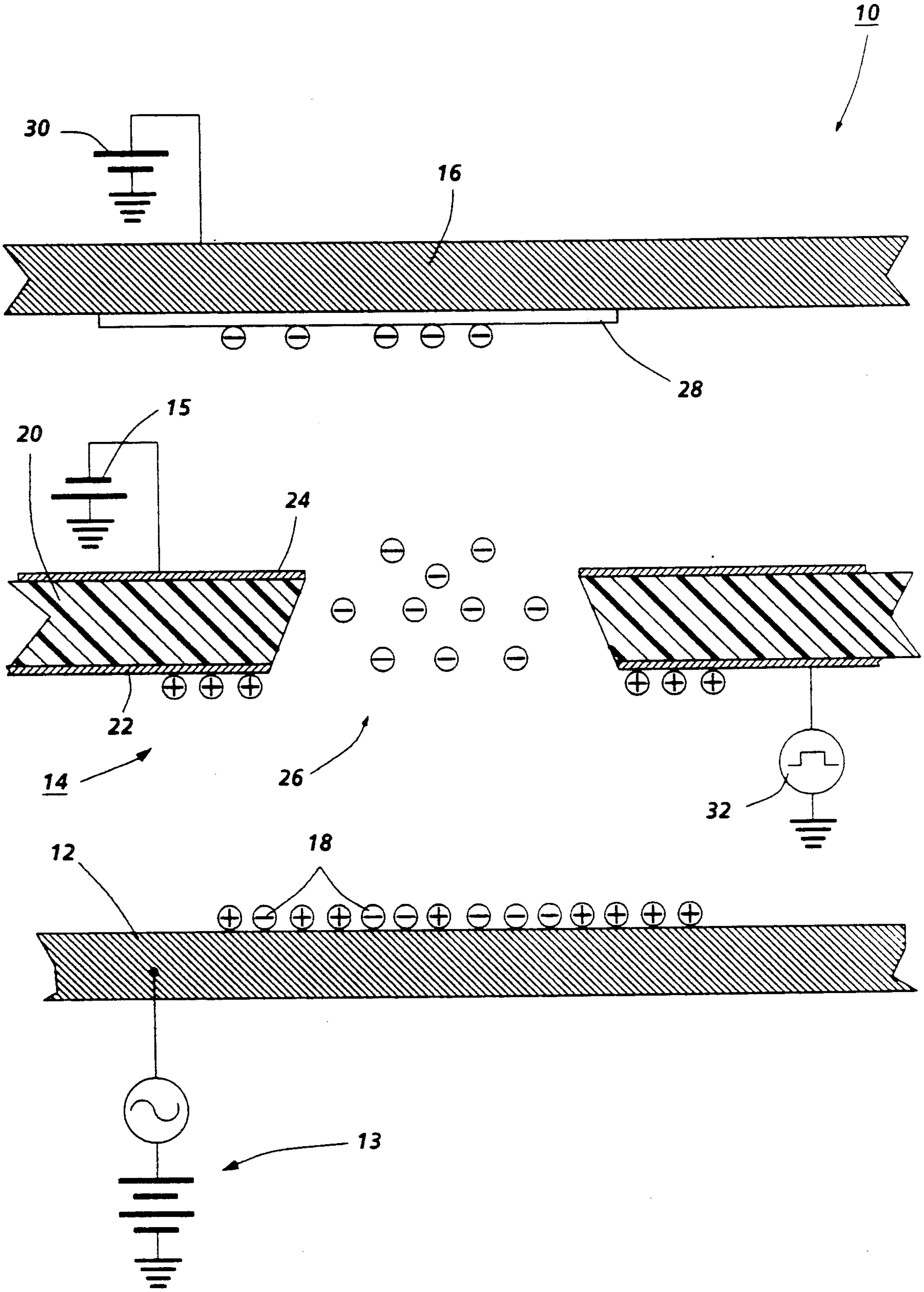
Figure 2:
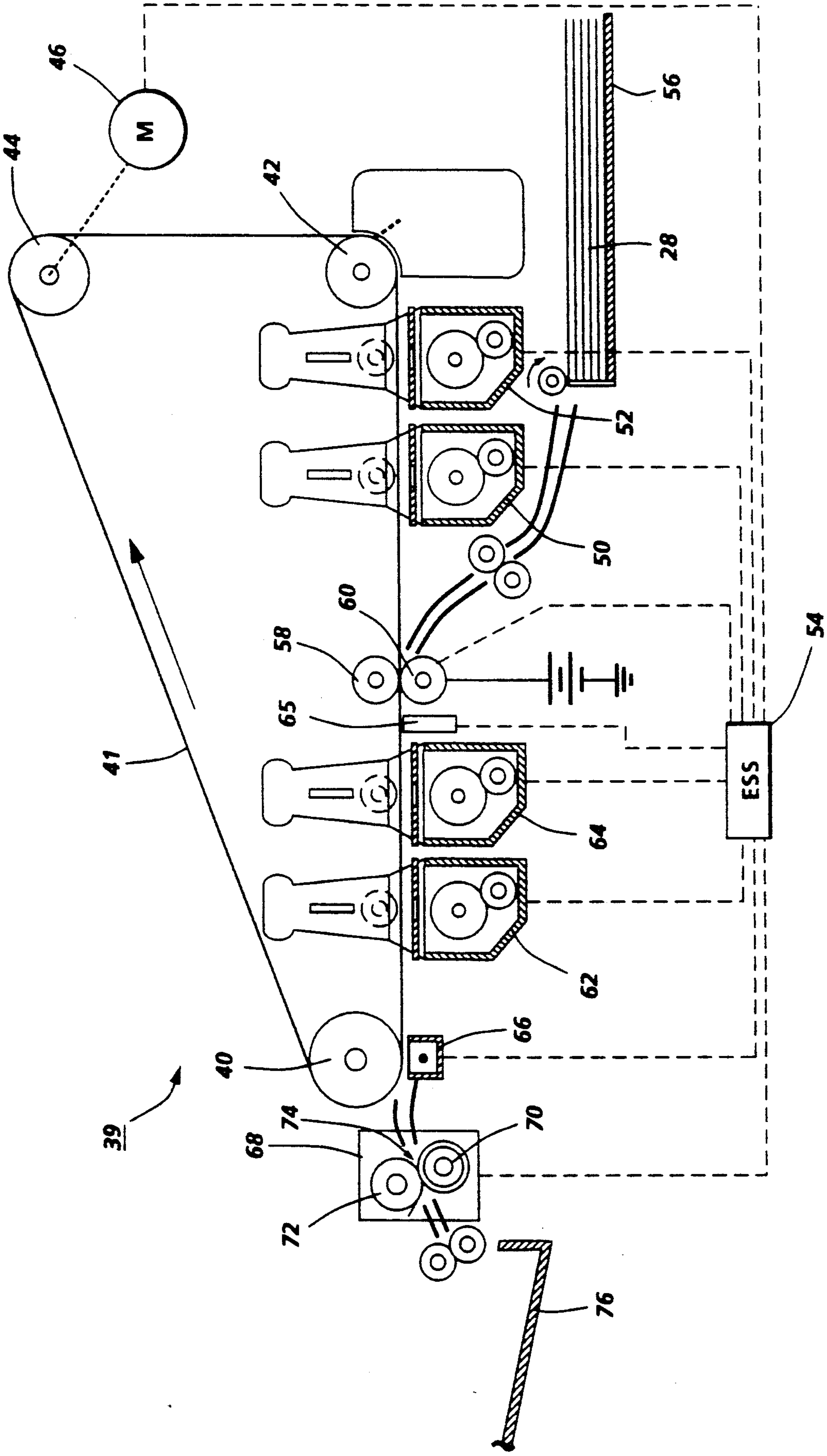

FIG. 1 is a schematic illustration of a DEP printing apparatus incorporated in the present invention; and FIG. 2 is a schematic illustration of a duplex printing system according to the invention.

DETAILED DESCRIPTION OF THE PREFERRED EMBODIMENT OF THE INVENTION

Disclosed in FIG. 1 is an embodiment of a Direct Electrostatic Printing (DEP) apparatus 10 incorporated the invention.

The printing apparatus 10 includes a developer delivery or conveying system generallly indicated by reference character 12, a printhead structure 14 and a backing electrode structure 16.

As disclosed herein, the developer delivery system 12 comprises a donor roll structure. The donor roll structure which is preferably coated with Teflon-S (Trademark of E. I. duPont) is spaced from the printhead approximately 0.003 to 0.015 inch. Teflon-S is a tetrafluoroethylene fluorocarbon polymer that is loaded with carbon black. Alternately, developer delivery system 12 may comprise any other suitable device know in the art. For example, it may comprise a Toner Cloud Development (T.C.D.) system of the type disclosed in U.S. Pat. No. 4,647,179. It may also comprise a belt. The primary purpose of the delivery system is to effect delivery of toner particles 18 to the printhead structure 14.

The developer preferably comprises any suitable insulative non-magnetic toner/carrier combination having Aerosil (Trademark of Degussa, Inc.) contained therein in an amount equal to $\frac{1}{2}$% by weight and also having zinc stearate contained therein in an amount equal to 1% by weight. The toner 18 may be charged positively or negatively. Purposes of this disclosure it is assumed that the toner is negatively charged.

The printhead structure 14 comprises a layered member including an electrically insulative base member 20 which may be fabricated from a polyimide film approximately 0.001 inch thick. The base member may be clad on the one side thereof with a continuous conductive electrode structure or shield 22 of aluminum which is approximately one micron thick. The opposite side of the base member 20 may carry a segmented conductive control electrode structure 24 thereon which is fabricated from aluminum. The printhead structure 14 is positioned in the printing device such that the shield electrode structure 22 faces the donor roll structure 12.

A plurality of holes or apertures 26 (only one of which is shown) approximately 0.007 inch in diameter are provided in the layered member in a pattern suitable for use in recording information. The apertures form an electrode array of individually addressable electrodes. A preferred aperture array is disclosed in U.S. Pat. No. 4,860,036, incorporated herein by reference. The '036 patent was granted to Fred W. Schmidlin on Aug. 22, 1989.

Movement of the charged toner to the printhead structure is effected through the application of a DC biased AC peak voltage of about 550 volts with a DC bias of +40 volts. This bias is provided via voltage source 13.

With a voltage applied to shield in accordance with the present invention and zero volts applied to an addressable electrode, toner 18 is propelled through the aperture associated with that electrode. The apertures extends through the base 20 and the conductive layers 22 and 24.

With a negative 350 volts applied to an addressable electrode via voltage source 15, toner is prevented from being propelled through the aperture. Image intensity can be varied by adjusting the voltage on the control electrodes between 0 and minus 350 volts. Addressing of the individual electrodes can be effected in any well known manner know in the art of printing using electronically addressable printing elements.

The addressing of the electrodes is synchronized with the arrival of a copy substrate or image receiver 28 adjacent the apertures. A suitable substrate sensor (not shown) is used for detection of the copy substrate 28. The output signal from the sensor is transmitted to a controller (not shown) to initiate addressing of the appropriate control electrodes.

The electrode or shoe 16 preferably has an arcuate shape but as will be appareciated, the present invention is not limited by such a configuration. The shoe 16 which is positioned on the opposite side of the plain paper copy substrate 28 from the printhead deflects the recording substrate in order to provide and extended area of contact between the medium and the shoe.

The substrate or recording medium 28 may comprise cut sheets of paper fed from a supply tray (not shown). The sheets of paper are spaced from the printhead 12 a distance in the order of 0.0005 to 0.030 inch as they pass therebetween. The sheets 58 are transported in contact with the shoe 16 via edge transport roll pairs 100.

During printing the shoe 16 is electrically biased to a DC potential of approximately +300 volts via a DC voltage source 30 for the purpose of attracting the toner particles moved through the apertures.

A pulsed DC or DC biased AC voltage is applied to the shield electrode structure 22 via voltage source 32. The voltage applied to the shield electrode structure is at the same frequency as the AC voltage applied to the toner supply but is approximately 180° out of phase therewith. The pulsed DC voltage is negative to coincide with the positive cycle of the AC voltage applied to the donor roll thereby establishing an electrostatic field about the shield electrode structure. Thus, the voltage applied to the shield electrode structure reduces the fringe field between the shield and control electrodes and increases the field between the toner supply and the shield. This causes wrong sign toner to be attracted to the shield electrode structure which is on the toner supply side of the printer rather than to the control electrode side of the printer. The natural AC jumping of toner occurring between the toner supply device and the shield electrode structure prevents buildup of toner particles around the printhead apertures. Thus, the present materials/process requirement of very low wrong sing toner for Direct Electrostatic Printing are relieved.

In the duplex printing system illustrated in FIG. 2 and generally indicated by the reference character 39, the electrode shoe 16 is replaced by an intermediate belt 41 which is entrained about a plurality of rollers 40, 42, and 44, the latter of which is operatively connected to a drive motor 46. The intermediate belt serves both as a DEP image receiver and an electrostatic paper transport. A plurality of DEP devices 50 and 52 similar to the one illustrated in FIG. 1 are positioned adjacent the intermediate belt and serve to form toner images on the belt. A single DEP device may be utilized to form monochrome images but when more than one DEP device is employed each of the devices utilizes toners having different physical properties. For example, the toners may be different colors or they may be the same color, in which case one may be non-magnetic while the other is magnetic. The formation of images with a plurality of different color toners may result in highlight color images or process color images in accordance with the way in which the system is utilized. Operation of the DEP devices as well as the movement of the intermediate belt are controlled via an Electronic Sub-System (ESS) 54. The ESS comprises electronic components and logic circuitry which are standard in the art for timing the actuations of the DEP devices as well establishing which of the apertures of the printhead structure will pass toner particles and which ones will not.

Once toner images are formed on the intermediate belt, a sheet of plain paper 34 is fed from a supply tray 56 into contact with images on the belt. A pair of rollers 58 and 60 are provided for electrostatically tacking the paper sheet and also providing electrostatic fields for effecting transfer of the images formed on the belt to the sheet of paper. To this end, the rollers 58 and 60 are electrically biased via a power source 62. The pressure rollers mechanically maintain intimate contact of the paper with the intermediate near the region of paper charging so that high electrostatic pressures can be achieved even with some paper distortion. It can be appreciated by those skilled in the art that there are many ways to achieve desired intimate paper contact near the region of paper charging. For example, a biased pressure roller can be used for the mechanical approach and for a portion of the paper charging, and a corona charging device close to this mechanical pressure device can be used to help generate the desired charging current density to the paper for electrostatic transport and to assist the toner transfer from the intermediate belt. The Xerox 9700 TM machine shows an example of one possible embodiment of a bias roll with a corotron assist transfer system. As another example, a pressure blade near a transfer corotron is used in the Xerox 5090 TM product.

It can be appreciated that a conventional electrostatic transfer design, for example a corona device without mechanical pressure assist devices, can be utilized in many applications where very little paper distortion is present. In fact, this invention helps enable this because paper distortion that typically will be present in the duplex imaging step of conventional multi-pass duplex systems, due to previous heating of the paper and fixing of the toner image in the simplex imaging step, will not be present with the single pass duplex process of this invention. It can also be appreciated that some systems may wish to allow wide amounts of paper distortion to be used with this invention, for example due to certain types of manufactured papers. In these cases, mechanical gripping assist such as gripper fingers or vacuum on the paper edges can be used with electrostatic forces to assist paper transport.

Reliable electrostatic tacking and transfer with high relative humidity conditioned papers requires careful attention in the paper charging design and also careful selection of the electrical properties of the surface of the intermediate belt. Lateral conduction along the paper from the paper charging region to nearby conductive members, such as lead-in baffles, that touch the paper during lead-in and lead-out of the paper is one problem that can cause significant loss of paper charge. To those skilled in the art, this is typically solved in electrostatic transfer systems by applying a suitable potential, opposite in polarity to the toner charge polarity, on the lead-in and lead-out baffles to allow sufficient charging of the laterally conductive high relative humidity conditioned papers. In some cases this can be adequately done by self biasing of the baffles with resistors or diodes connected between the electrically isolated baffles and ground reference for the machine. In this case, the lateral current flow along the papers under high relative humidity conditions causes the baffle bias. The bias baffle approaches work very well for electrostatic transfer and electrostatic tacking if the toner image is being transferred from relatively insulating materials such as a photoconductor surface in the dark.

The bias baffle approach will not work acceptably if the resistivity of the intermediate surface is too low because the paper charge can then conduct along the paper to the local microscopic contact area regions between the paper and intermediate surface. This can drive the net paper charge, the electrostatic field for transfer and the electrostatic pressure between the paper and intermediate to very low levels during the contact dwell time of the paper and intermediate. To prevent this, the resistivity of the surface of the intermediate belt 41 must be chosen to be sufficiently insulating. Any material on the surface of the intermediate having a decay time for charge dissipation that is longer than the contact dwell time of the paper on the intermediate, which is typically in the 0.25 to 5.0 second range for most configurations envisioned to be used with this invention, can be used to prevent this problem. It can be appreciated by those familiar to the art that there are numerous insulating or semi-conductive materials with sufficiently high resistivity to meet this criteria, such as mylar, tedlar, kynar, polycarbonate as typical examples.

The sufficiently high resistivity surface layer will be on top of a support base in the preferred embodiment for the intermediate. The base can be a conductive substrate such as Ni or stainless steel, or it can for example be a metalized plastic base such as aluminized mylar with the aluminized layer facing the thin top surface layer. Electrical connection for the conductive portion of the base layer provides the necessary bias reference for the paper charging, toner transfer to the paper, and for the DEP imaging process. Most photoconductive belt structures can be used as the intermediate for this invention and these have an advantage that light can be used to dissipate cyclic charge buildup on the intermediate for process stability during continuous cyclic imaging. An example of a photoconductive belt structure that can be used with this invention is the type of structure used in xerographic products such as in the Xerox 1075 TM. If a photoconductor is not used, cyclic charge buildup can be prevented by conditioning of the surface of the intermediate belt with, for example, corona devices, as is well known to those skilled in the art.

Continued movement of the intermediate belt together with the paper sheet tacked thereto effects movement of the sheet of paper past another pair of DEP devices 62 and 64 which are utilized for forming different color images on the side of a sheet of paper opposite to the one containing the images transferred thereto from the intermediate belt.

The potential difference between the conductive substrate of the intermediate belt and the DEP heads 62 and 64 will generally need to be adjusted differently than the values chosen for the DEP heads 50 and 52 to compensate for the effect on the fields near the DEP head caused by the charge on the paper. The effect of the charge on the paper on the fields near the DEP heads 62 and 64 will depend, for example, on the thickness, the electrical properties of the paper used and on the environmental conditions. If the paper properties are known or measured in the machine, and if the environmental conditions are known, the DEP head voltages can be automatically adjusted for proper imaging conditions. Automatic compensation for environmental and paper property variations can also be achieved by sensing the voltage above the charged paper on the intermediate just prior to the DEP imaging head. This can be done using a type of sensor 65 generally known to those in the art as an electrostatic voltmeter. An average value obtained from such a measurement can then be used in a standard way to those skilled in the art to automatically update the voltage conditions on the DEP heads 62 and 64 for optimum imaging for the given paper or environmental conditions, such updating being accomplished through signals generated by the sensor 65 and processed via the ESS 54. It is known by those skilled in the art that the measured voltage above the paper acts just like an equivalent applied substrate voltage of equal value to the measured voltage above the paper. Thus the updated DEP head voltage conditions can be simply referenced to the measured voltage above the paper.

A corona discharge device 66 positioned adjacent the roller 40 can be used to assist paper separation from the intermediate belt and also to reduce the chance of toner disturbance during the separation process, as is well known to those skilled in the art of detack in typical transfer systems.

A duplex fuser indicated by reference character 68 includes a heated fuser roll 70 and a heated pressure roll 72 cooperating to form a nip 74 through which the image receiver sheets pass. An image receiver with fused images is deposited into a paper catch tray 76.

What is claimed is:

1. Duplex printing apparatus, said apparatus comprising:

at least two direct printing devices;

a first image receiver comprising an endless belt, said endless belt being supported for movement past said at least two direct printing devices;

a second image receiver comprising a sheet of plain paper;

means for moving said second image receiver into contact with toner images deposited on said first image receiver by one of said direct printing devices;

means for tacking said second image receiver to said first image receiver for movement therewith past the other of said direct printing devices; and means for actuating the other of said direct printing devices for forming toner images on said image receiver on the side thereof opposite the side containing the images transferred from said image receiver.

2. Apparatus according to claim 1 further including direct printing devices utilizing toner having physical properties which are different from the toner utilized by said at least two printing devices.

3. Apparatus according to claim 2 wherein said toner having physical properties which are different from the toner utilized by said at least two direct printing devices comprises a different color toner.

4. Apparatus accoridng to claim 3 wherein said direct printing devices comprise DEP devices.

5. Duplex printing apparatus including a plurality of DEP devices, each including:

a supply of toner containing right and wrong sign particles;

a conductive shield structure;

a control electrode structure;

an insulative member supporting the conductive shield structure and the control electrode structure to form an apertured printhead structure;

means for establishing an electrostatic field between the supply of toner and the printhead structure for moving toner particles from the supply in the direction of the printhead structure;

means for effecting movement of toner particles through selected apertures of the printhead structure; and means for minimizing deposition of wrong sign toner particles on the control electrode structure;

the improvement comprising:

a first image receiver supported for movement past at least two DEP devices;

a second image receiver;

means for moving said second image receiver into contact with toner images deposited on said first image receiver by one of said DEP devices;

means for tacking said second image receiver to said first image receiver for movement therewith past the other of said DEP devices; and means for actuating the other of said DEP devices for forming toner images on said image receiver on the side thereof opposite the side containing the images transferred from said first image receiver.

6. Apparatus according to claim 5 wherein said first image receiver comprises an endless belt.

7. Apparatus according to claim 6 wherein said second image receiver comprises a sheet of plain paper.

8. Apparatus according to claim 7 further including DEP devices utilizing toner having physical properties which are different from the toner utilized by said at least two DEP devices.

9. Apparatus according to claim 8 wherein said toner having physical properties which are different from the toner utilized by said at least two DEP devices comprises a differenct color toner.

10. The method of forming duplex images said method including the steps of:

providing at least two direct printing devices;

providing a first image receiver supported for movement past said least two direct printing devices;

providing a second image receiver;

moving said second image receiver into contact with toner images deposited on said first image receiver by one of said direct printing devices;

tacking said second image receiver to said first image receiver for movement therewith past the other of said direct printing devices; and actuating the other of said direct printing devices for forming toner images on said image receiver on the side thereof opposite the side containing the images transferred from said first image receiver.

11. The method according to claim 10 wherein said first image receiver comprises an endless belt.

12. The method according to claim 11 wherein said second image receiver comprises a sheet of plain paper.

13. The method according to claim 12 further including direct printing devices utilizing toner having physical properties which are different from the toner utilized by said at least two printing devices.

14. The method according to claim 13 wherein said toner having physical properties which are different from the toner utilized by said at least two direct printing devices comprises a different color toner.

15. The method according to claim 3 wherein said direct printing devices comprise DEP devices.

16. The method of forming duplex images including utilizing a plurality of DEP devices, each including:

a supply of toner containing right and wrong sign particles;

a conductive shield structure;

a control electrode structure;

an insulative member supporting the conductive shield structure and the control electrode structure to form an apertured printhead structure;

means for establishing an electrostatic field between the supply of toner and the printhead structure for moving toner particles from the supply in the direction of the printhead structure;

means for effecting movement of toner particles through selected apertures of the printhead structure; and means for minimizing deposition of wrong sign toner particles on the control electrode structure;

the improvement comprising:

supporting a first image receiver for movement past at least two DEP devices;

providing a second image receiver;

moving said second image receiver into contact with toner images deposited on said first image receiver by one of said DEP devices;

tacking said second image receiver to said first image receiver for movement therewith past the other of said DEP devices; and actuating the other of said DEP devices for forming toner images on said image receiver on the side thereof opposite the side containing the images transferred from said first image receiver.

17. The method according to claim 16 wherein said first image receiver comprises an endless belt.

18. The method according to claim 17 wherein said second image receiver comprises a sheet of plain paper.

19. This method according to claim 18 further including DEP devices utilizing toner having physical properties which are different from the toner utilized by said at least two DEP devices.

20. The method according to claim 19 wherein said toner having physical properties which are different from the toner utilized by said at least two DEP devices comprises a different color toner.

21. The method according to claim 11 wherein said endless belt comprises a relatively insulating top surface.

22. The method according to claim 11 wherein said endless belt comprises a photoconductive structure.

23. The method according to claim 10 including the steps of measuring the voltage in the area of said second image receiver prior to actuating said other of said direct printing devices and adjusting the operation of said other of said direct printing services in response to the measured voltage.

24. Apparatus according claim 1 wherein said endless belt comprises a relatively insulating top surface.

25. Apparatus according claim 1 wherein said endless belt comprises a photoconductive structure.

26. Apparatus according to claim 1 including means for measuring the voltage in the area of said second image receiver prior to actuating said other of said direct printing devices and means for adjusting the operation of said other of said direct printing devices in response to the measured voltage.

* * * * *